United States Patent [19]

Shinogle et al.

[11] Patent Number: 5,494,220
[45] Date of Patent: Feb. 27, 1996

[54] FUEL INJECTOR ASSEMBLY WITH PRESSURE-EQUALIZED VALVE SEAT

[75] Inventors: Ronald D. Shinogle, Peoria; Avtar S. Sandhu, Bloomington, both of Ill.

[73] Assignee: Caterpillar Inc., Peoria, Ill.

[21] Appl. No.: 287,097

[22] Filed: Aug. 8, 1994

[51] Int. Cl.$^6$ .................................................. F02M 47/00
[52] U.S. Cl. ...................................... 239/88; 251/129.01
[58] Field of Search .................... 239/88–96; 251/129.21

[56] References Cited

U.S. PATENT DOCUMENTS

| | | | |
|---|---|---|---|
| 2,144,862 | 1/1939 | Truxell, Jr. | 239/88 |
| 2,421,329 | 5/1947 | Hoffer | 210/166 |
| 2,434,586 | 1/1948 | Reynolds | 31/58 |
| 2,512,557 | 6/1950 | Weldy | 239/453 |
| 2,535,937 | 12/1950 | Bozec et al. | 239/533.12 X |
| 2,552,445 | 5/1951 | Nielsen | 239/456 |
| 2,597,952 | 5/1952 | Rosenlund | 137/139 |
| 2,621,011 | 12/1952 | Smith | 251/27 |
| 2,672,827 | 3/1954 | McGowen, Jr. | 103/232 |
| 2,727,498 | 12/1955 | Reiners | 123/32 |
| 2,749,181 | 6/1956 | Maxwell et al. | 239/584 |
| 2,916,048 | 12/1959 | Gunkel | 137/544 |
| 3,035,780 | 5/1962 | Peras | 239/453 |
| 3,057,560 | 10/1962 | Campbell | 239/464 |
| 3,071,714 | 1/1963 | Hadekel | 317/172 |
| 3,175,771 | 3/1965 | Bréting | 239/533 |
| 3,410,519 | 11/1968 | Evans | 251/141 |
| 3,532,121 | 10/1970 | Sturman et al. | 137/625.4 |
| 3,570,806 | 3/1971 | Sturman et al. | 251/65 |
| 3,570,807 | 3/1971 | Sturman et al. | 251/65 |
| 3,570,833 | 3/1971 | Sturman et al. | 267/161 |
| 3,585,547 | 6/1971 | Sturman | 335/227 |
| 3,604,959 | 9/1971 | Sturman et al. | 310/12 |
| 3,675,853 | 7/1972 | Lapera | 239/464 |
| 3,683,239 | 8/1972 | Sturman | 317/150 |
| 3,743,898 | 7/1973 | Sturman | 317/154 |
| 3,753,547 | 8/1973 | Topham | 251/120 |
| 3,814,376 | 6/1974 | Reinicke | 251/65 |
| 3,821,967 | 7/1974 | Sturman et al. | 137/624.15 |
| 3,835,829 | 9/1974 | Links | 123/139 E |
| 3,858,135 | 12/1974 | Gray | 335/266 |

(List continued on next page.)

FOREIGN PATENT DOCUMENTS

| | | |
|---|---|---|
| 0425236A1 | 5/1991 | European Pat. Off. . |
| 0246373B1 | 3/1992 | European Pat. Off. . |
| 981664 | 12/1982 | U.S.S.R. . |

OTHER PUBLICATIONS

Frankl, et al., "Electronic Unit Injectors–Revised," *SAE Technical Paper Series*, 40th Annual Earthmoving Industry Conference, Peoria, Illinois, (Apr. 11–13, 1989).

Roters, "Electromagnetic Devices," First Edition, pp. 44–45, 67, 70.

Sturman, "Breakthrough in Digital Valves," *Machine Design*, vol. 66, No. 4, dated Feb. 21, 1994, pp. 37–42.

*Primary Examiner*—Andres Kashnikow
*Assistant Examiner*—Lesley D. Morris
*Attorney, Agent, or Firm*—Marshall O'Toole Gerstein Murray and Borun

[57] ABSTRACT

A fuel injector assembly having a valve with a valve seat and at least one pressure-equalizing fuel cavity to reduce pressure variations at the valve seat when the valve is in a closed position. The fuel injector assembly has a fuel injector body and a fuel inlet formed in the fuel injector body. A nozzle with a nozzle fuel cavity is formed in the fuel injector body, and a nozzle check is disposed for reciprocating movement in the nozzle. A valve having a valve element and a valve seat is disposed in the fuel injector body. The valve element has a first position relative to the valve seat in which the fuel inlet is fluidly isolated from the nozzle fuel cavity and a second position relative to the valve seat in which the fuel inlet is fluidly coupled to the nozzle fuel cavity. A fuel supply bore supplies pressurized fuel to a valve fuel cavity formed in the valve, and an annular pressure-equalizing fuel cavity is disposed adjacent the valve fuel cavity and adjacent a periphery of the valve element to reduce fluid pressure variations in the valve fuel cavity so that the fluid seal at the valve seat is not weakened.

30 Claims, 2 Drawing Sheets

U.S. PATENT DOCUMENTS

| | | | |
|---|---|---|---|
| 3,989,066 | 11/1976 | Sturman et al. | 137/624.2 |
| 4,087,736 | 5/1978 | Mori et al. | 322/28 |
| 4,087,773 | 5/1978 | Jencks et al. | 335/243 |
| 4,107,546 | 8/1978 | Sturman et al. | 307/141 |
| 4,108,419 | 8/1978 | Sturman et al. | 251/30 |
| 4,114,647 | 9/1978 | Sturman et al. | 137/624.2 |
| 4,114,648 | 9/1978 | Nakajima et al. | 137/625.5 |
| 4,120,456 | 10/1978 | Kimura et al. | 239/464 |
| 4,152,676 | 5/1979 | Morgenthaler et al. | 333/24.1 |
| 4,189,816 | 2/1980 | Chalansonnet | 29/148.4 |
| 4,192,466 | 3/1980 | Tanasawa et al. | 239/464 |
| 4,231,525 | 11/1980 | Palma | 239/585 |
| 4,248,270 | 2/1981 | Ostrowski | 138/45 |
| 4,266,727 | 5/1981 | Happel et al. | 239/409 |
| 4,273,291 | 6/1981 | Müller | 239/533.12 |
| 4,275,693 | 6/1981 | Leckie | 123/447 |
| 4,308,891 | 1/1982 | Loup | 137/551 |
| 4,354,662 | 10/1982 | Thompson | 251/129 |
| 4,375,274 | 3/1983 | Thoma et al. | 239/117 |
| 4,392,612 | 7/1983 | Deckard et al. | 239/88 |
| 4,396,037 | 8/1983 | Wilcox | 137/625.65 |
| 4,409,638 | 10/1983 | Sturman et al. | 361/152 |
| 4,482,094 | 11/1984 | Knape | 239/88 |
| 4,501,290 | 2/1985 | Sturman et al. | 137/495 |
| 4,516,600 | 5/1985 | Sturman et al. | 137/495 |
| 4,518,147 | 5/1985 | Andresen et al. | 251/121 |
| 4,526,519 | 7/1985 | Mowbray et al. | 417/490 |
| 4,541,454 | 9/1985 | Sturman et al. | 137/505.41 |
| 4,558,844 | 12/1985 | Donahue, Jr. | 251/118 |
| 4,610,428 | 9/1986 | Fox | 251/129.16 |
| 4,653,455 | 3/1987 | Eblen et al. | 123/506 |
| 4,658,824 | 4/1987 | Scheibe | 123/472 |
| 4,702,212 | 10/1987 | Best et al. | 123/472 |
| 4,721,253 | 1/1988 | Noguchi et al. | 239/464 |
| 4,753,416 | 6/1988 | Inagaki et al. | 251/129.15 |
| 4,794,890 | 1/1989 | Richeson, Jr. | 123/90.11 |
| 4,811,221 | 3/1989 | Sturman et al. | 364/420 |
| 4,812,884 | 3/1989 | Mohler | 335/258 |
| 4,813,599 | 3/1989 | Greiner et al. | 239/456 |
| 4,831,989 | 5/1989 | Haines | 123/506 |
| 4,846,440 | 7/1989 | Carlson et al. | 251/129.17 |
| 4,875,499 | 10/1989 | Fox | 137/82 |
| 4,893,102 | 1/1990 | Bauer | 335/132 |
| 4,893,652 | 1/1990 | Nogle et al. | 137/596.17 |
| 4,928,887 | 5/1990 | Miettaux | 239/584 |
| 4,964,571 | 10/1990 | Taue et al. | 239/88 |
| 4,993,637 | 2/1991 | Kanesaka | 239/96 |
| 5,004,577 | 4/1991 | Ward | 264/112 |
| 5,042,445 | 8/1991 | Peters et al. | 123/446 |
| 5,049,971 | 9/1991 | Krumm | 357/55 |
| 5,050,543 | 9/1991 | Kawamura | 123/90.11 |
| 5,110,087 | 5/1992 | Studtmann et al. | 251/129.16 |
| 5,121,730 | 6/1992 | Ausman et al. | 123/467 |
| 5,131,624 | 7/1992 | Kreuter et al. | 251/129.18 |
| 5,161,779 | 11/1992 | Graner et al. | 251/129.16 |
| 5,188,336 | 2/1993 | Graner et al. | 251/129.16 |

FUEL INJECTOR ASSEMBLY WITH PRESSURE-EQUALIZED VALVE SEAT

TECHNICAL FIELD

The present invention relates to a fuel injector assembly having a fuel valve with a valve seat and a pressure-equalizing fuel cavity to reduce pressure variations around the periphery of the valve seat to prevent or minimize weakening of the fluid seal at the valve seat.

BACKGROUND ART

In conventional fuel injection systems, the fuel injectors may be mechanically or hydraulically actuated. In mechanically actuated systems, the pumping assembly which periodically causes fuel to be injected into the engine cylinders is mechanically coupled or linked to a cam driven by the engine so that the pumping assembly is actuated in synchronism with the rotation of the cam. In hydraulically actuated systems, the pumping assembly is hydraulically driven by pressurized actuating fluid which is selectively communicated to the pumping assembly by an electronically-controlled valve. One example of a hydraulically actuated, electronically controlled fuel injection system is disclosed in U.S. Pat. No. 5,121,730 to Ausman, et al. on Jun. 16, 1992.

Another fuel injection system is disclosed in U.S. Pat. No. 4,392,612 to Deckard, et al. As described in connection with FIG. 1 of that patent, the Deckard, et al. fuel injection system has a mechanically actuated pump plunger which acts to periodically increase the pressure in a passage disposed in a spray tip provided with a reciprocable needle valve. When the fuel pressure in the passage increases to a threshold amount, the fuel pressure in the passage forces the needle-valve to open, and fuel is ejected from the spray tip.

The supply of fuel to the spray tip passage and the buildup of fuel pressure in the spray tip passage is controlled by a solenoid actuated, pressure-balanced valve in the form of a hollow poppet valve. When the poppet valve is open, fuel may be supplied to the spray tip passage, and when the poppet valve is closed, the fuel in the spray tip passage may be pressurized sufficiently by the pump plunger to effect injection.

The use of a poppet valve such as the one described in Deckard, et al. may be undesirable when used at very high fuel pressures, such as those in excess of 140,000 MPa (20,000 pounds per square inch or psi), due to fluid leakage at the valve seat when the valve is in the closed position as a result of pressure variations around the periphery of the valve, as described below in connection with FIGS. 1–4.

Referring to FIG. 1, a cross-sectional elevational view of a simple valve 10 is shown. The valve 10 has a valve element 12 that is reciprocable within a valve body 14 between a closed position in which the valve element 12 abuts a valve seat 16 and an open position in which the valve element 12 is spaced from the valve seat 16. The reciprocation of the valve element 12 is controlled by an actuator (not shown). When the valve element 12 is in the open position, fluid is allowed to pass from a bore 18 in fluid communication with the valve inlet, to an annular cavity 20 surrounding a portion of the periphery of the valve element 12, and to a bore 22 in fluid communication with the valve outlet.

Problems may occur with the operation of the valve 10 of FIG. 1 if it were to be used where the fluid in the bore 18 is at a very high pressure, such as in excess of 140,000 MPa (20,000 psi). In particular, such a high pressure in the bore 18 would result in pressure variations within the annular fluid cavity 20 about the periphery of the valve element 12 in a horizontal plane close to the valve seat 16. A rough approximation of such pressure variations is shown in FIG. 2, in which areas of relatively high pressure are represented with the letter "H" and areas of relatively low pressure are represented by the letter "L." Such pressure variations may undesirably result in fluid leakage through the fluid seal at the valve seat 16 when the valve element 12 is in its closed position. Such undesirable pressure variations are present in the cavity 20 even where multiple bores 18 are provided in the valve 10, as illustrated in FIGS. 3 and 4.

DISCLOSURE OF THE INVENTION

The present invention is directed to a fuel injector assembly in which fluid pressure variations around the periphery of a valve element are reduced., In one aspect, the fuel injector assembly has a control valve with a valve seat and a pressure-equalizing fuel cavity to reduce pressure variations at the valve seat when the control valve is in a closed position. The fuel injector assembly has a fuel injector body and a fuel inlet formed in the fuel injector body. A nozzle with a nozzle fuel cavity is formed in the fuel injector body, and a nozzle check is disposed for reciprocating movement in the nozzle.

The valve element has a first position relative to the valve seat in which the fuel inlet is fluidly isolated from the nozzle fuel cavity and a second position relative to the valve seat in which the fuel inlet is fluidly coupled to the nozzle fuel cavity. A fuel supply bore supplies pressurized fuel to a valve fuel cavity, and an annular pressure-equalizing fuel cavity is disposed adjacent the valve fuel cavity and adjacent a periphery of the valve element to reduce fluid pressure variations in the valve fuel cavity so that the fluid seal at the valve seat is not weakened.

The fuel supply bore of the fuel injector assembly may lie in a direction perpendicular to the opening direction of the valve. The pressure-equalizing fuel cavity of the fuel injector assembly may be disposed adjacent an inner periphery of the valve element. The length of the valve element which is adjacent to both the valve fuel cavity and the pressure-equalizing fuel cavity may have a substantially constant diameter. The pressure-equalizing fuel cavity may be disposed adjacent an end of the valve element. The valve fuel cavity and the pressure-equalizing fuel cavity may be disposed about an inner periphery of the valve element, the valve fuel cavity may have a first diameter, and the pressure-equalizing fuel cavity may have a second diameter substantially smaller than the first diameter. The valve fuel cavity and the pressure-equalizing fuel cavity may be disposed about an outer periphery of the valve element, the valve fuel cavity may have a first diameter, and the the pressure-equalizing fuel cavity may have a second diameter substantially larger than the first diameter.

In another aspect, the invention is directed to a fuel injector assembly having a fuel injector body in which a control valve with a valve element and a valve seat is disposed. The valve element is movable by a hydraulic actuator in an opening direction and in a closing direction between a closed position in which the valve element is in contact with the valve seat and an open position in which the valve element is spaced from the valve seat. Fuel is supplied to the control valve by fluid supply means having a first cavity, which is in contact with the valve element, that exerts a fluid pressure on the valve element that is non-constant about the periphery of the valve element and a second cavity which is annularly disposed around a periphery of the valve element to reduce fluid pressure variations thereabout. The fluid may be supplied to the valve at a pressure of at least 140,000 MPa (20,000 psi), with the pressure exerted on the valve element being non-constant about the periphery of the valve element.

The second cavity may be disposed adjacent an inner periphery of the valve element. The length of the valve element which is adjacent to both the first cavity and the second cavity may have a substantially constant diameter. The second cavity may be disposed adjacent an end of the valve element. The first cavity and the second cavity may be disposed about an inner periphery of the valve element, the first cavity may have a first diameter, and the second cavity may have a second diameter substantially smaller than the first diameter. The first cavity and the second cavity may be disposed about an outer periphery of the valve element, the first cavity has a first diameter, and the second cavity may have a second diameter substantially larger than the first diameter. The valve element may have a substantially hollow interior portion, and the annular cavity may be disposed around an inner periphery of the valve element.

BEST MODE FOR CARRYING OUT THE INVENTION

Figure 5:
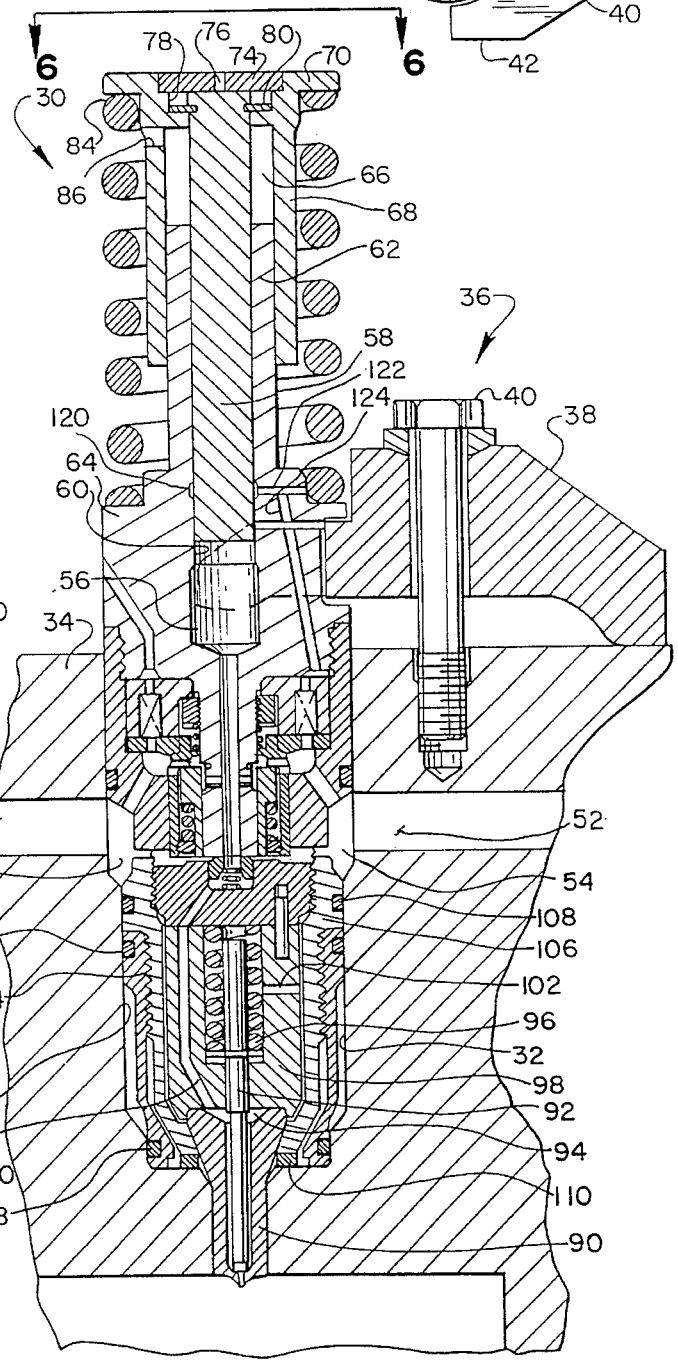
FIG. 5 is a diagrammatic cross-sectional view of a first embodiment of a fuel injector in accordance with the invention.

One embodiment of a fuel injector assembly in accordance with the invention is shown in FIG. 5, which illustrates a linearly actuated, electronically-controlled unit fuel injector (LEUI) 30. Although the LEUI fuel injector 30 is adapted for a diesel-cycle, direct-injection internal combustion engine, the fuel injector 30 may be used with any type of diesel engine, ignition-assisted engine or any other type of engine where it is necessary or desirable to inject fuel into an ignition chamber.

Figure 1:
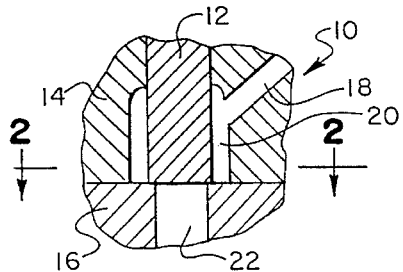
FIG. 1 is a diagrammatic cross-sectional view of a conventional valve in which fluid pressure variations are present about the periphery of the valve element.
Figure 2:
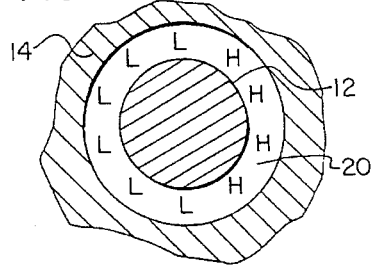
FIG. 2 is a diagrammatic cross-sectional partial view taken along line 2—2 of FIG. 1.
Figure 3:
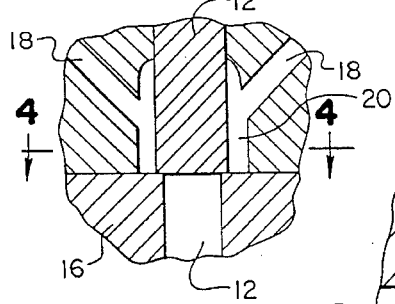
FIG. 3 is a diagrammatic cross-sectional view of a second conventional valve in which fluid pressure variations are present about the periphery of the valve element.
Figure 4:
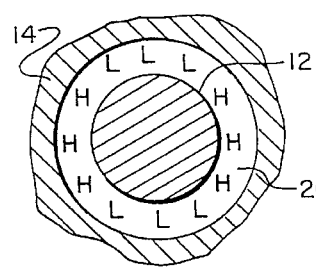
FIG. 4 is a diagrammatic cross-sectional partial view taken along line 4—4 of FIG. 3.
Figure 6:
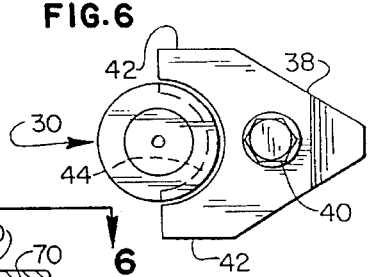
FIG. 6 is a diagrammatic top view of the fuel injector and mounting assembly taken along line 6—6 of FIG. 5.

The fuel injector 30 is mounted in a generally cylindrical bore 32 in an engine block 34 via a mounting assembly 36. The mounting assembly 36 includes a clamp 38 and a bolt 40 which threadably secures the clamp 38 to the engine block 34. As shown in FIG. 6, which is a schematic top view of the clamp 34 and the injector 30, the clamp 38 is generally Y-shaped and has two arms 42 which are disposed with a slot 44 formed in the fuel injector 30.

Referring back to FIG. 5, fuel is provided to the fuel injector 30 via a fuel supply conduit 50 formed in the engine block 34, and excess fuel drains from the injector 30 via a fuel return conduit 52. The fluid supply conduit 50 and the fluid drain conduit 52 are fluid interconnected by an annular fuel cavity 54 which surrounds the outer periphery of the fuel injector 30.

The fuel supplied by the fuel supply conduit 50, which is pressurized to a pressure of about 420 MPa (60 psi), periodically flows, between injection cycles, to a generally cylindrical fuel pressurization chamber 56 formed in the center of the fuel injector 30. The fuel in the pressurization chamber 56 is periodically pressurized to a pressure in excess of 140,000 MPa (20,000 psi), and for example to about 210,000 MPa (30,000 psi), by a cylindrical plunger 58 which reciprocates within a cylindrical bore 60 formed in a cylindrical extension 62 of a portion 64 of the fuel injector body.

The cylindrical extension 62 is received within an annular recess 66 formed by the outer portion of the plunger 58 and the inner portion of an annular extension 68 of a tappet 70. The top portion of the tappet 70 has a cylindrical recess in which a disk 74 having an oil hole 76 is provided. The tappet 70 has a second cylindrical recess 78 in which a retaining disk 80 is provided. The retaining disk 80 is provided within a slot formed in the plunger 58 and is therefore anchored to the plunger 58. The tappet 70 is spring-biased away from the first portion 64 of the fuel injector body by a spring 84. The disk 74 provided in the tappet 70 is mechanically connected to a rocker arm (not shown) which is driven by a cam (not shown) on a camshaft which controls when fuel injection occurs. The tappet 70 has a bore 86 formed therein to enable air to escape from the annular recess 66 when the tappet 70 and the plunger 58 are forced downwards by the rocker arm.

A nozzle 90 from which fuel is periodically emitted is provided at the bottom portion of the fuel injector 30. A nozzle check 92 is provided in a fuel cavity 94 formed in the interior of the nozzle 90. The nozzle check 92 is spring-biased downwards by a spring 96 provided in the interior of a body guide 98 so that the bottom tip of the nozzle check 92 seals a bore in the bottom of the nozzle 90 thus preventing the emission of fuel. The nozzle check 92 is shaped so that pressurized fluid in the nozzle cavity 94 generates an upward force on the nozzle check 92. When the pressure in the fuel cavity 94 reaches a predetermined threshold, the nozzle check 92 is forced upwards, overcoming the downward force generated by the spring 96, and the nozzle 90 is opened and emits fuel.

The body guide 98 has a first bore 100 formed therein for supplying fuel to the nozzle fuel cavity 94 and a second bore 102 formed therein to allow drainage of any fluid from the interior of the body guide 98.

The body guide 98 and the nozzle 90 are disposed in the interior of a first case member 106 which has a first O-ring 108 provided around its periphery and a second O-ring 110 provided at its bottom portion. The first case member 106 is disposed within a second case member 114 which has a pair of O-rings 116, 118 provided about its periphery.

An annular cavity 120 is shown to surround the periphery of the bottom portion of the plunger 58. The annular cavity 120 is fluidly connected to a pair of drainage bores 122, 124 to allow drainage of any fluid that reaches the annular cavity 120 from the pressurizing chamber 56.

Figure 7:
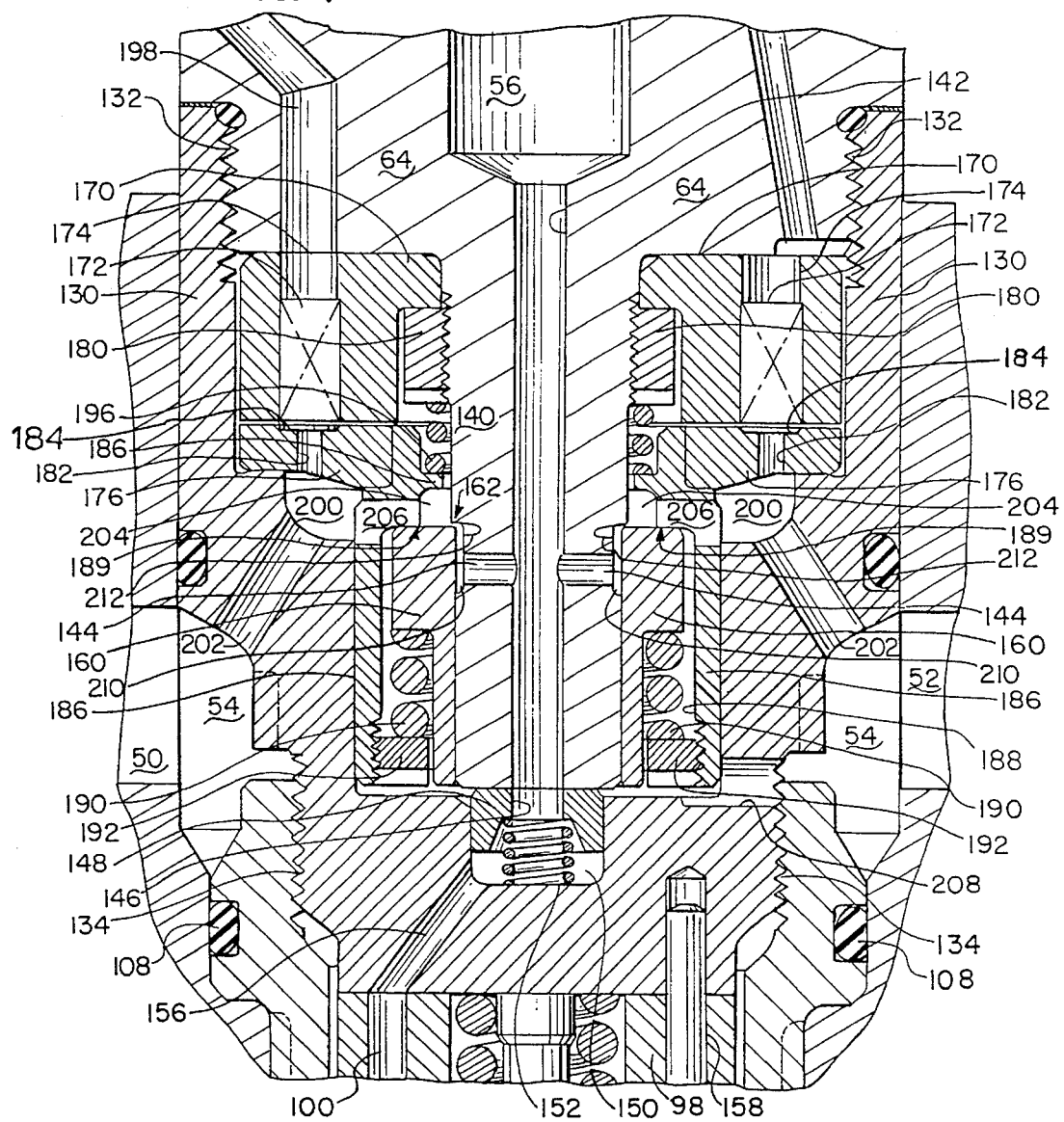
FIG. 7 is a diagrammatic enlarged cross-sectional view of an intermediate portion of the fuel injector of FIG. 5.

An enlarged cross-sectional view of the central portion of the fuel injector 30 is shown in FIG. 7. Referring to FIG. 7, the central portion of the fuel injector 30 includes a fuel injector body portion 130 which is threadably connected at its upper end to the injector body portion 64 via a threaded portion 132 and is threadably connected at its lower end to the first case member 106 via a threaded portion 134.

The injector body portion 64 has a downward cylindrical extension 140 in which a vertical bore 142 is disposed. The vertical bore 142 is in fluid communication with the fuel pressurizing chamber 56 and with a pair of transverse bores 144 formed in the extension 140. The bore 142 is also in fluid communication with a bore 146 formed in a hat check 148 provided in a fluid cavity 150 formed in the injector body portion 130. The hat check 148 is spring-biased upwards against the bottom portion of the cylindrical extension 140 by a spring 152 in order to provide a fluid seal between the cylindrical extension 140 and the injector body portion 130. The fluid cavity 150 is in fluid communication with the fuel supply bore 100 via a fluid bore 156. The injector body portion 130 is disposed in alignment with a dowel pin 158 disposed in pair of bores formed in the injector body portion 130 and the body guide 98.

A control valve which controls when fuel injection may occur is provided in the interior of the injector body portion 130. The control valve comprises a reciprocable valve element 160 in the form of a poppet having a substantially hollow interior portion in which a portion of the downward extension 140 is disposed. The valve element 160 is reciprocable in opening and closing directions between a closed position in which it makes contact with a valve seat 162 formed integrally with the cylindrical extension 140 and an open position in which the valve element 160 is spaced from the valve seat 162.

The control valve is actuated by a solenoid actuator comprising an annular pole member 170, an energizable wire coil schematically shown at 172 provided within an annular recess 174 in the pole member 170, and an annular armature 176. The pole member 170 is fixed against the injector body portion 64 via a solenoid retaining nut 180 threaded on the cylindrical extension 140. The armature 176 has a plurality of bores 182 formed therein about its circumference through which fluid may pass in order to facilitate more rapid movement of the armature 176. The upper portion of the armature 176 has a relatively shallow annular recess 184 formed therein in alignment with the annular wire coil 172.

A carrier member 186 is fixed to the armature 176, such as by laser welding, and has a central recess 188 in which the valve element 160 is disposed. The valve element 160 is retained against an annular surface 189 within the carrier member 186 via a spring 190 and a retaining nut 192 threaded into the interior of the carrier member 186.

The armature 176 and the carrier member 186 are spring-biased away from the pole member 170 via a spring 196 connected between the solenoid retaining nut 180 and the carrier member 186. A bore 198 is formed above the left-hand portion of the wire coil 172 in alignment with the annular recess 174 to accommodate the wires (not shown) which are connected to the wire coil 172.

The annular fuel cavity 54 is fluidly connected to an annular cavity 200 formed in the interior of the injector body portion 130 via a plurality of bores 202. Although two such bores 202 are shown, more of them could be utilized about the circumference of the injector body portion 130. The annular cavity 200 is fluidly connected to an annular cavity 204 formed in the carrier member 186 via a plurality of bores 206. A horizontal bore 208 is disposed in the injector body portion 130 to allow passage of fuel between the interior of the body portion 130 and the annular fuel cavity 54.

The transverse bores 144 formed in the cylindrical extension 140 are fluidly connected to an annular cavity 210 of a first diameter that is disposed about the inner periphery of the valve element 160 and in contact with the valve element 160. A second annular cavity 212 is fluidly connected to the annular cavity 210. The annular cavity 212 has a smaller diameter (which may be the same diameter as the outer diameter of the extension 140 at the elevation of the cavity 212) than that of the annular cavity 210, and the cavity 212 is disposed at the approximate location where the valve element 160 makes contact with the valve seat 162. The smaller diameter of the annular cavity 212 results in its having a greater effective width than that of the cavity 210. As a result of the increased width, the pressure-equalizing annular fuel cavity 212 minimizes fluid pressure variations which occur about the periphery of the cavity 210, thus resulting in an improved fluid seal between the valve element 160 and the valve seat 162.

The operation of the fuel injector 30 over one fuel injection period is as follows. Prior to injection, when the wire coil 172 of the solenoid actuator is not energized, the armature 176 is spaced from the pole member 170 via the biasing spring 196, and as a result, the annular surface 189 of the carrier member 182 forces the valve element 160 to be in its open position in which it is spaced from the valve seat 162. Consequently, pressurized fuel from the fuel bores 50, 52 is supplied to the fuel pressurizing chamber 56 via a flow path including the bores 202, the annular cavity 200 in the injector body portion 130, the bores 206, the annular cavity 204 in the carriage member 186, the annular cavity 210 formed in the cylindrical extension 140, the transverse bores 144, and the central bore 142 in the cylindrical extension 140.

To start injection, the wire coil 172 of the solenoid actuator is electrically energized. As a result, the armature 176 is drawn towards the pole member 170, thus causing the valve element 160 to move to its closed position where it is in contact with the valve seat 162. When the valve element 160 is in its closed position, the fluid flow path between the fuel pressurizing chamber 56 and the annular recess 54 is cut off.

The only remaining fuel path from the fuel pressurizing chamber 56 is through the central bore 142 in the cylindrical extension, through the bore 146 in the hat check 148, through the cavity 150 in the injector body portion 130, through the bore 156 in the injector body portion, through the fuel supply bore 100 in the body guide 98, and to the fuel cavity 94 in the nozzle 90.

After energization of the solenoid actuator, as the plunger 58 is forced downwards by the rocker arm (not shown) attached to the disk 74, the fuel pressure in the pressurizing chamber 56 increases, and thus the fuel pressure in the nozzle cavity 94, also increases. When the fuel pressure in the nozzle cavity 94 reaches a threshold pressure, the force exerted by the fluid pressure causes the nozzle check 92 to be forced upwards, thus opening the nozzle and causing fuel to be injected.

To end the injection, the wire coil 172 of the solenoid actuator is electrically deenergized, causing the armature 176 and the carrier member 186 to be moved away from the pole member 170, which causes the annular surface 189 of the carrier member 182 to force the valve element 160 to be moved to its open position spaced from the valve seat 162.

As a result, the nozzle fuel cavity 94 (and the pressurizing chamber 56) is fluidly connected to a low pressure fuel path via the transverse bores 144, the annular cavity 210, the cavity 204, the bores 206, the cavity 200 and the bores 202. Consequently, the pressure in the nozzle fuel cavity 94 decreases rapidly below the threshold pressure required to open the spring-biased nozzle check 92, and the nozzle check 92 moves downward, closing the nozzle and terminating injection.

Then, while the valve element 160 remains in its open position spaced from the valve seat 162, the plunger 58 is drawn upwards by the rocker arm (not shown), and additional fuel is drawn into the fuel pressurizing chamber 56 from the annular cavity 54 via the flow path previously described.

Figure 8:
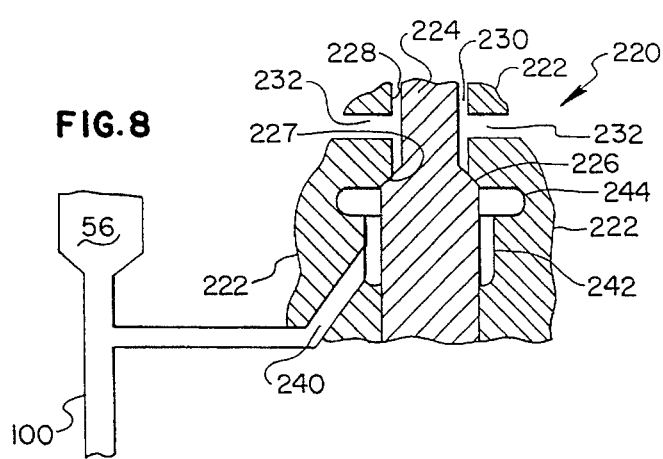
FIG. 8 is a diagrammatic cross-sectional view of a portion of a second embodiment of a fuel injector in accordance with the invention.

A cross-sectional view of a portion of a second embodiment of a fuel injector assembly is shown in FIG. 8. Referring to FIG. 8, a control valve 220 has a valve body 222 in which a reciprocable valve element 224 in the form of a solid poppet is disposed. The valve element 224 has an annular bevel 226 which makes sealing engagement with an angled annular valve seat 227 formed by the valve body 222. The valve body 222 has a cylindrical bore 228 formed therein which is of a diameter larger than the diameter of the portion of the valve element 224 above the bevel 226 so as to form an annular flow cavity 230. The annular cavity 230 is fluidly connected to a plurality of bores 232, which are fluidly connected to the annular fuel cavity 54 (FIG. 5).

The valve body 222 has an angled bore 240 formed therein, a first annular cavity 242 fluidly connected to the angled bore 240, and a second annular cavity 244 fluidly connected to the first annular cavity 242. As shown schematically in FIG. 8, when incorporated in the fuel injector assembly, the angled bore 240 is fluidly connected to the pressurization chamber 56 and to the bore 100 which is fluidly connected to the nozzle cavity 94 (FIG. 5). The pressure-equalizing second annular fuel cavity 244, which has a larger diameter (which may be the same diameter as the internal diameter of the valve body 222 at the elevation of the cavity 244) than the first annular cavity 242 and which is disposed about the outer periphery of the valve element 224 just below the valve seat 227, minimizes fluid pressure variations which occur about the periphery of the valve element 224 at the valve seat 227, thus resulting in an improved fluid seal between the bevel 226 and the valve seat 227.

The operation of the second embodiment is generally the same as the first embodiment described above. The reciprocation of the valve element 224 is controlled by the solenoid actuator. When the control valve 220 is in its closed position as shown in FIG. 8, fuel may be highly pressurized so that injection occurs. When the control valve 220 is in its open position, fuel may not be highly pressurized since there is a low-pressure fuel path from the pressurization chamber 56 and through the bore 240, the annular cavities 242, 244, 230, and the bores 232 to the annular fuel cavity 54.

Industrial Applicability

The fuel injector assembly described above has numerous applications in industry, such as in diesel fuel injection systems. Such fuel injection systems could include, for example, hydraulically actuated, electronically controlled unit injection systems or mechanically actuated, electronically controlled unit injection systems.

Numerous modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

We claim:

1. A fuel injector assembly having a valve with a valve seat and a pressure equalizing fuel cavity to reduce pressure variations at the valve seat when the valve is in a closed position, said fuel injector assembly comprising:

a fuel injector body;

a fuel inlet formed in said fuel injector body;

a nozzle associated with said fuel injector body, said nozzle having a nozzle fuel cavity formed therein;

a nozzle check disposed for reciprocating movement in said nozzle in an opening direction and a closing direction between an open position and a closed position;

a valve disposed in said fuel injector body, said valve having a valve element and a valve seat, said valve element having a first position relative to said valve seat in which said fuel inlet is fluidly isolated from said nozzle fuel cavity and a second position relative to said valve seat in which said fuel inlet is fluidly coupled to said nozzle fuel cavity, said valve element being translatable in an opening direction from said first position to said second position and in a closing direction from said second position to said first position;

a fuel supply bore for supplying pressurized fuel to said valve;

a valve fuel cavity fluidly connected to said fuel supply bore and said valve element, said valve fuel cavity being in contact with said valve element;

a pressure-equalizing fuel cavity disposed adjacent said valve fuel cavity and adjacent a periphery of said valve element, said pressure-equalizing fuel cavity being annular; and means for periodically opening and closing said valve whereby fuel is periodically ejected from said nozzle.

2. A fuel injector assembly as defined in claim 1 wherein said fuel supply bore lies in a direction perpendicular to said opening direction of said valve.

3. A fuel injector assembly as defined in claim 1 wherein said means for periodically opening and closing said valve comprises a solenoid actuator.

4. A fuel injector assembly as defined in claim 1 wherein said valve element comprises a hollow poppet having a substantially hollow interior portion and wherein said fuel supply bore provides pressurized fuel to said substantially hollow interior portion of said poppet.

5. A fuel injector assembly as defined in claim 1 wherein said nozzle check comprises check means shaped such that pressurized fuel in said nozzle fuel cavity exerts a fluid force in said opening direction of said nozzle check when said nozzle check is in said closed position, said nozzle check being moved from its closed position to its open position when said pressurized fuel in said nozzle cavity reaches a predetermined pressure.

6. A fuel injector assembly as defined in claim 1 wherein said pressure-equalizing fuel cavity is disposed adjacent an inner periphery of said valve element.

7. A fuel injector assembly as defined in claim 1 wherein said pressure-equalizing fuel cavity is disposed adjacent an outer periphery of said valve element.

8. A fuel injector assembly as defined in claim 1 wherein said valve element comprises valve element means shaped such that neither said valve fuel cavity nor said pressure-equalizing fuel cavity exerts any fluid force on said valve element in said opening direction when said valve element is in said first position.

9. A fuel injector assembly as defined in claim 8 wherein the length of said valve element which is adjacent to both said valve fuel cavity and said pressure-equalizing fuel cavity has a substantially constant diameter.

10. A fuel injector assembly as defined in claim 1 wherein said pressure-equalizing fuel cavity is disposed adjacent an end of said valve element.

11. A fuel injector assembly as defined in claim 1 wherein said valve fuel cavity comprises an annular cavity.

12. A fuel injector assembly as defined in claim 11 wherein said valve fuel cavity and said pressure-equalizing fuel cavity are disposed about an inner periphery of said valve element, wherein said valve fuel cavity has a first diameter, wherein said pressure-equalizing fuel cavity has a second diameter, and wherein said second diameter is substantially smaller than said first diameter.

13. A fuel injector assembly as defined in claim 11 wherein said valve fuel cavity and said pressure-equalizing fuel cavity are disposed about an outer periphery of said valve element, wherein said valve fuel cavity has a first diameter, wherein said pressure-equalizing fuel cavity has a second diameter, and wherein said second diameter is substantially larger than said first diameter.

14. A fuel injector assembly having a valve with a valve seat in which pressure variations at the valve seat are reduced when the valve is in a closed position, said fuel injector assembly comprising:

a fuel injector body;

a valve disposed in said fuel injector body, said valve having a valve element and a valve seat, said valve element being movable in an opening direction and in a closing direction between a closed position in which said valve element is in contact with said valve seat and an open position in which said valve element is not in contact with said valve seat;

actuator means for causing said valve element to be reciprocated between said open position and said closed position; and fluid supply means for supplying fluid to said valve comprising first cavity means in contact with said valve element which exerts a fluid pressure on said valve element that is non-constant about the periphery of said valve element and second cavity means fluidly connected to said first cavity means, said second cavity means being annularly disposed around a periphery of said valve element to reduce fluid pressure variations about the periphery of said valve element.

15. A fuel injector assembly as defined in claim 14 wherein said second cavity means is disposed adjacent an inner periphery of said valve element.

16. A fuel injector assembly as defined in claim 14 wherein said second cavity means is disposed adjacent an outer periphery of said valve element.

17. A fuel injector assembly as defined in claim 14 wherein said valve element comprises valve element means shaped such that neither said first cavity means nor said second cavity means exerts any fluid force on said valve element in said opening direction when said valve element is in said closed position.

18. A fuel injector assembly as defined in claim 17 wherein the length of said valve element which is adjacent to both said first cavity means and said second cavity means has a substantially constant diameter.

19. A fuel injector assembly as defined in claim 14 wherein said second cavity means is disposed adjacent an end of said valve element.

20. A fuel injector assembly as defined in claim 14 wherein said first cavity means comprises an annular cavity.

21. A fuel injector assembly as defined in claim 20 wherein said first cavity means and said second cavity means are disposed about an inner periphery of said valve element, wherein said first cavity means has a first diameter, wherein said second cavity means has a second diameter, and wherein said second diameter is substantially smaller than said first diameter.

22. A fuel injector assembly as defined in claim 20 wherein said first cavity means and said second cavity means are disposed about an outer periphery of said valve element, wherein said first cavity means has a first diameter, wherein said second cavity means has a second diameter, and wherein said second diameter is substantially larger than said first diameter.

23. A fuel injector assembly having a valve with a valve seat in which pressure variations at the valve seat are reduced when the valve is in a closed position, said fuel injector assembly comprising:

a fuel injector body;

a valve disposed in said fuel injector body, said valve having valve element means and a valve seat, said valve element means being reciprocable in an opening direction and in a closing direction between a closed position in which said valve element means is in contact with said valve seat and an open position in which said valve element means is not in contact with said valve seat, said valve element means having an end adjacent said valve seat;

actuator means for causing said valve element means to be reciprocated between said open position and said closed position;

fluid supply means for supplying fluid to said valve at a pressure of at least 140,000 MPa (20,000 psi), said fluid supply means causing a fluid pressure to be exerted on said valve element means that is non-constant about the periphery of said valve element means; and pressure-equalizing means comprising annular cavity means, disposed around a periphery of said valve element means, for causing a substantially equal fluid pressure to be exerted about the periphery of said end of said valve element means adjacent said valve seat.

24. A fuel injector assembly as defined in claim 23 wherein said valve element means has a substantially hollow interior portion and wherein said annular cavity means is disposed around an inner periphery of said valve element means.

25. A fuel injector assembly as defined in claim 24 wherein said fluid supply means comprises a first annular cavity and wherein said pressure-equalizing means comprises a second annular cavity fluidly connected to said first annular cavity.

26. A fuel injector assembly as defined in claim 25 wherein each of said first and second annular cavities has a diameter, the diameter of said second annular cavity being substantially smaller than the diameter of said first annular cavity.

27. A fuel injector assembly as defined in claim 23 wherein said annular cavity means is disposed around an outer periphery of said valve element means.

28. A fuel injector assembly as defined in claim 27 wherein said fluid supply means comprises a first annular cavity and wherein said pressure-equalizing means comprises a second annular cavity fluidly connected to said first annular cavity.

29. A fuel injector assembly as defined in claim 28 wherein each of said first and second annular cavities has a diameter, the diameter of said second annular cavity being substantially larger than the diameter of said first annular cavity.

30. A fuel injector assembly as defined in claim 23 wherein said actuator means comprises a solenoid actuator.

* * * * *